United States Patent [19]
Lin et al.

[11] Patent Number: 6,163,583
[45] Date of Patent: Dec. 19, 2000

[54] DYNAMIC CLOCKING APPARATUS AND SYSTEM FOR REDUCING POWER DISSIPATION

[75] Inventors: Kenneth C. Lin, San Jose; Andrew W. Yu, Saratoga; Takahiro Kurata, San Jose, all of Calif.

[73] Assignees: Sony Corporation of Japan, Tokyo, Japan; Sony Electronics, Inc., Park Ridge, N.J.

[21] Appl. No.: 09/048,132

[22] Filed: Mar. 25, 1998

[51] Int. Cl.[7] ...................................................... H04L 7/00
[52] U.S. Cl. ............................................ 375/354; 713/600
[58] Field of Search .................................... 375/354, 355, 375/356, 357, 376; 713/400, 500, 501, 600, 601, 322

[56] References Cited

U.S. PATENT DOCUMENTS

| | | | |
|---|---|---|---|
| 5,666,522 | 9/1997 | Klein ........................................ | 713/501 |
| 5,978,926 | 11/1999 | Ries et al. ................................ | 713/501 |
| 6,005,904 | 12/1999 | Knapp et al. ............................ | 375/376 |
| 6,035,357 | 3/2000 | Sakaki ...................................... | 710/102 |

*Primary Examiner*—Stephen Chin
*Assistant Examiner*—Chieh M. Fan

*Attorney, Agent, or Firm*—Wagner, Murabito & Hao LLP

[57] ABSTRACT

A dynamic clocking computer system for a processor. The dynamic clocking computer system comprises a clock divider circuit, a multiplexer, and a state machine circuit. The clock divider circuit receives a first clock and outputs the first clock and generates a second clock. The second clock is supplied to external circuitry. The state machine circuit is coupled to the clock divider circuit and receives the first and second clocks from the clock divider circuit. The state machine circuit also receives an external access signal indicating an internal clock to select from the first and second clocks. In response to the external access signal, the state machine circuit generates a select signal to enable the multiplexer to select an internal clock. When the selected internal clock is the second clock, the internal clock is synchronized to the second clock. The multiplexer is coupled to the clock divider circuit and receives the first and second clocks through the clock divider circuit. In response to the select signal generated by the state machine circuit, the multiplexer selects an internal clock from the first and second clocks. The internal clock is then provided to the processor. By thus providing a lower clock frequency to the processor for external access operations, the present invention reduces power dissipation.

26 Claims, 4 Drawing Sheets

DYNAMIC CLOCKING APPARATUS AND SYSTEM FOR REDUCING POWER DISSIPATION

FIELD OF THE INVENTION

The present claimed invention relates to the field of frequency switching. More particularly, the present claimed invention relates to dynamically switching frequencies in computer systems.

BACKGROUND ART

Digital systems have proliferated into entertainment, education, communication, business, etc. A digital system is generally comprised of devices designed to manipulate physical quantities or information that are represented in digital form. From the simplest on/off switching devices to the most complex computer systems, the digital system is typically electronic in form. Some of the examples of digital systems are calculators, digital computers, digital audio and video equipment, and the telephone system.

In a digital system, the clock is a signal (e.g., pulse) used to specify the precise times at which other signals change their state and thereby synchronize electronic components in integrated circuits. The clock signal is generally a rectangular pulse train or square wave. The clock signal is typically distributed to all parts of a digital system and most of the system outputs can change their state only when the clock makes transitions. For example, positive-going transition or rising edge transition refers to the change in clock state from logic 0 to logic 1. Conversely, negative-going transition or falling edge transition refers to the change in clock from logic 1 to logic 0.

Digital or computer systems typically include one or more processor chips mounted on a system board (e.g., motherboard). Traditionally, the processor and the system board have run at a same clock speed or frequency. For example in the earliest personal computers, both the processor and the system board ran at a speed of about 5 MHz. The one-to-one clock ratio between the processor and the system board was simple to design and implement in an integrated circuit (IC).

Over the years the speed of the processor and the system board has gradually increased thereby providing greater bandwidth and faster switching speed. In this evolution toward greater clock speed however, the increase in processor clock speed has been several times that of the increase in system board clock speed. For example, the clock speed for the processor has increased from about 5 MHz to over 300 MHz. In contrast, the clock speed of system board increased to only about 75 MHz.

The main reason for the difference in clock speed between the processor and the system board is the difference in loading. The processor clock is typically embedded in an integrated circuit chip driving its signal a distance of only a few millimeters. In contrast, the system board clock typically is required to support a myriad of devices and peripheral components such as a video chip, an audio chip, a modem, a network chip, an I/O chip, etc., and as a result, typically drives a signal distance of 10 times or more greater than the distance required of the processor clock. In addition, the processor is smaller in size than the system bus. Speeding up the speed the circuits of a chip is much easier than speeding up the circuits in the system board, which has longer, more heavily loaded, and noisier bus lines. Hence, the increase in system board clock speed has not kept up with the increase in the processor clock speed.

The difference in clock speed between the processor and the system board has required a coordination mechanism in conventional digital systems. A conventional coordination approach uses a bus unit to provide differing clocks to the processor and the system board. The bus unit allows the processor to run at the higher internal clock speed while allowing the system board to run at the lower external clock speed. The conventional bus unit typically allows ratios of two-to-one or four-to-one speed ratios. For example, a conventional four-to-one bus unit may allow an external clock provided to the system board to operate at 50 MHz and an internal clock provided to the processor to operate at 200 MHz.

Unfortunately, the conventional bus unit approach requires and dissipates more power by running the processor at the higher internal clock speed at all times. Running the internal clock at a constant rate several times the external clock rate is inefficient because a substantial amount of processor time is consumed in input/output (I/O) operations such as load/store operations that does not require the higher clock speed. This is because power is directly proportional to the clock speed at which the processor runs.

SUMMARY OF THE INVENTION

Thus, what is needed is an apparatus and system for synchronously switching the speed of a processor's internal clock to match external clocks during an external access in order to reduce power dissipation. Accordingly, the present invention satisfies this need by providing a finite state machine controlled clock switching circuit.

The present invention provides a dynamic clocking apparatus and system for a processor. The dynamic clocking apparatus comprises a clock divider circuit, a multiplexer, and a state machine circuit. The clock divider circuit receives a first clock and outputs the first clock and generates a second clock. The second clock is supplied to external circuitry. The state machine circuit is coupled to the clock divider circuit and receives the first and second clocks from the clock divider circuit. The state machine circuit also receives an external access signal indicating an internal clock to select from the first and second clocks.

In response to the external access signal, the state machine circuit generates a select signal to enable the multiplexer to select an internal clock. When the selected internal clock is the second clock, the internal clock is synchronized to the second clock. Similarly, when the selected internal clock is the first clock, the internal clock is synchronized to the first clock. The multiplexer is coupled to the clock divider circuit and receives the first and second clocks through the clock divider circuit. In response to the select signal generated by the state machine circuit, the multiplexer selects the internal clock from the first and second clocks. The selected internal clock is then provided to the processor. By thus providing a lower clock frequency to the processor during external access operations, the present invention reduces power dissipation in a computer system.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

In the following detailed description of the present invention, a dynamic clocking apparatus and system for reducing power dissipation, numerous specific details are set forth in order to provide a thorough understanding of the present invention. However, it will be obvious to one skilled in the art that the present invention may be practiced without these specific details. In other instances, well known methods, procedures, components, and circuits have not been described in detail so as not to unnecessarily obscure aspects of the present invention.

Figure 1:
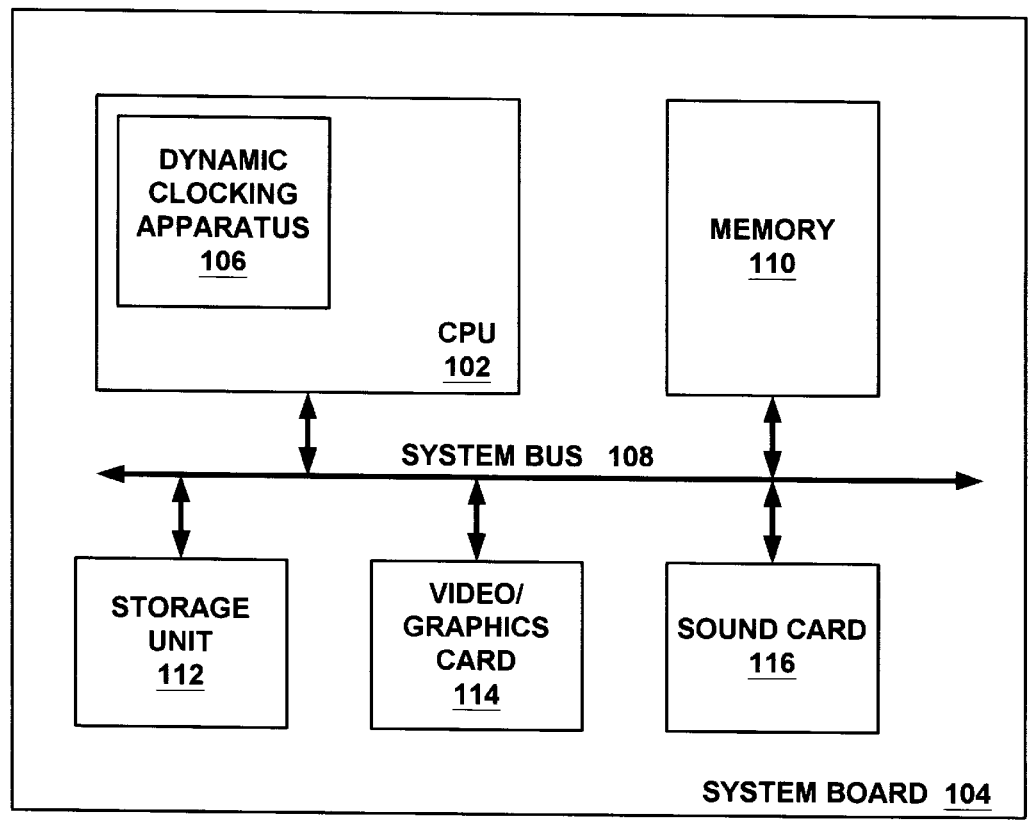
FIG. 1 illustrates a block diagram of computer system including a processor and a system board.

FIG. 1 illustrates a block diagram of a computer system 100. The computer system 100 consists of a processor 102 (e.g., CPU) disposed on a system board 104 (e.g., PC board, motherboard, external circuit, etc.). The processor 102 is electrically coupled to the system board 104. In one embodiment, the processor 102 can be mounted on a processor slot provided on the system board 104. The system board 104 includes a system (address, data, and control) bus 108 which provides electrical connection for various components and devices disposed on the system board 104. For example, the system board 104 typically provides one or more slots for electrically coupling the system bus 108 to peripheral devices such as a memory 110, a storage unit 112 (e.g., hard disk), a video/graphics card 114, a sound card 116, a modem, a network card, an input/output card, etc. Those skilled in the art will recognize that the system bus 108 can be implemented in accordance with various bus standards such as Peripheral Component Interconnect (PCI), Industry Standard Architecture (ISA), Accelerated Graphics Port (AGP), etc.

With reference to FIG. 1, the processor 102 includes a dynamic clocking apparatus 106 in accordance with the present invention. The dynamic clocking apparatus provides the proper clock to the processor 102 for reducing power dissipation in accordance with the present invention. Depending on the activity performed within system 100, the frequency of the clock supplied to the processor 102 changes in accordance with the present invention. As used herein, a clock refers to a signal (e.g., pulse) that specifies the precise times at which another signal can change its state. In one embodiment, the clock signal is generally a rectangular pulse train or square wave. The clock signal is typically distributed to all parts of a computer system and most of the system outputs can change their state only when the clock makes transitions (e.g., edges). It should be appreciated that although the present invention is illustrated in reference to the processor 102, it can be utilized to provide dynamic clocking to other devices and components in a computer system capable of running at more than one clock speed to reduce power dissipation in a similar manner.

Figure 2:
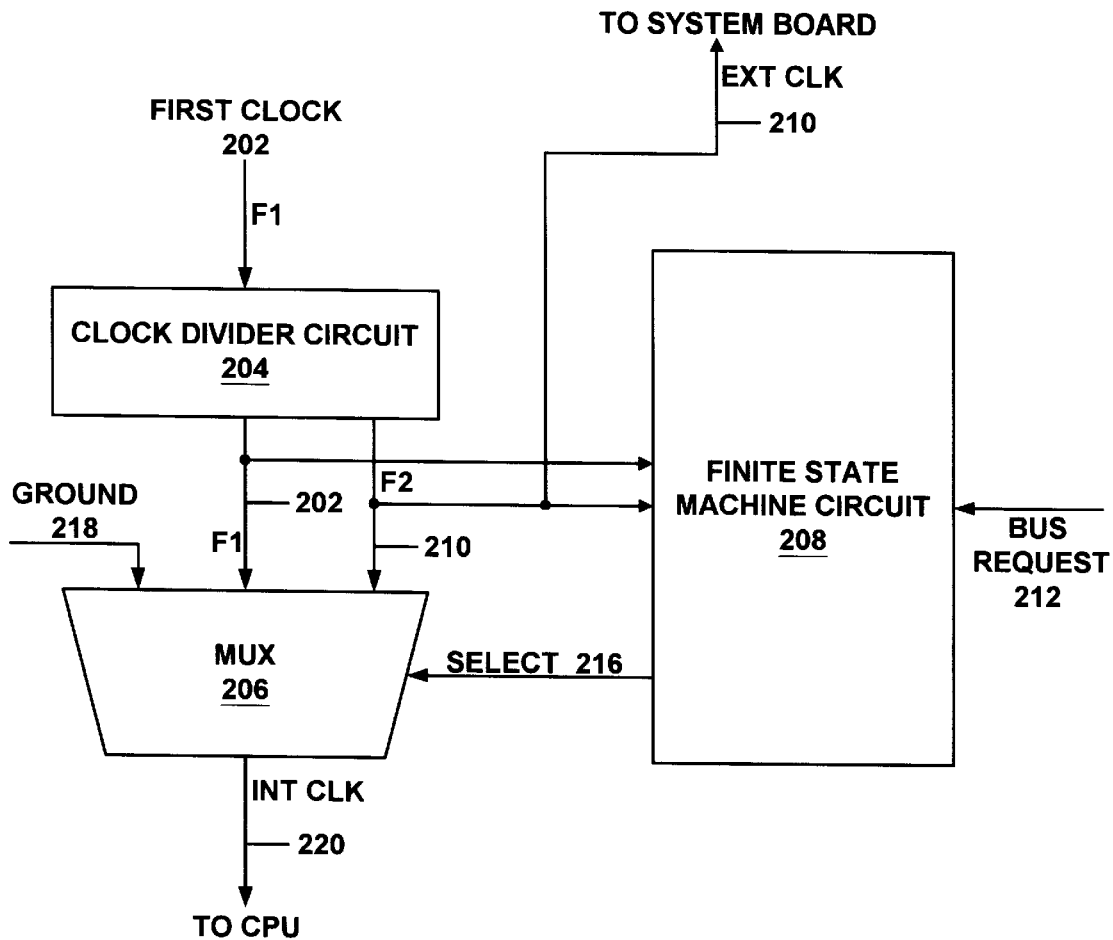
FIG. 2 shows a detailed block diagram of a dynamic clocking apparatus in accordance with the present invention.

FIG. 2 shows a detailed block diagram of the dynamic clocking apparatus 106 in accordance with the present invention. The dynamic clocking apparatus 106 includes a clock divider circuit 204, a finite state machine circuit 208, and a multiplexer 206 ("mux"). The clock divider circuit 204 receives a first clock 202 of frequency F1, and generates a second clock 210 of frequency F2. For example, the clock divider circuit 204 may receive clock F1 202 of 100 MHz and generate clock F2 210 of 25 MHz. In one embodiment, the present invention also includes a phase lock loop (PLL) clock generator (not shown) for generating the first clock 202 of frequency F1. Within the present invention, the master clock can be disposed either on or off the chip on which the processor 102 is disposed.

Clock divider circuit 204 can be implemented using well known techniques. In one embodiment, the clock divider circuit 204 of FIG. 2 can be implemented as a counter. As a counter, the clock divider circuit 204 counts a certain number of the pulses in the incoming first clock 202 and generates a clock pulse for the second clock 210. For instance, in order to generate a second clock 210 of 25 MHz from the first clock 202 of 100 MHz, the clock divider circuit 204 counts every four clocks of the first clock 202 and generates a clock pulse for the second clock 210 every four clock cycles of the first clock 202. In a preferred embodiment of the present invention, the clock divider circuit 204 also outputs the first clock 202 with frequency F1. Although the clock divider circuit 204 of FIG. 2 generates one clock over line 210, it should be appreciated that the clock divider circuit 204 of the present invention can generate any number of frequencies less than or equal to the input frequency, F1 202.

The first clock 202 passed through and supplied by the clock divider circuit 204 is the faster clock and is used as an internal clock 220 (INT CLK) for the processor 102 during certain circumstances. On the other hand, the second clock 210 generated by the clock divider circuit 204 is the slower clock, which can be used as an internal clock 220 (INT CLK) for the processor 102 as well as an external clock 210 (EXT CLK) for the system board 104. The system board 104 receives the external clock 210 (EXT CLK) which runs at the speed of the lower second clock 210. In this configuration, the processor 102, in contrast, can run at an internal clock speed of either the higher first clock 202 or the lower second clock 210.

The internal clock 220 of FIG. 2 can be switched through the multiplexer 206. The multiplexer 206 receives as inputs the first and second clocks 202 and 210, respectively, and selects one of the two clocks 202 and 210 to provide as an internal clock 220 to the processor 106. In one embodiment, the multiplexer 206 also receives a ground signal over line 218 as an input (used for clock synchronization). These three inputs are selected in accordance with a two-bit select signal supplied over lines 216 provided from the finite state machine circuit 208.

In accordance with the present invention, the finite state machine circuit 208 detects the states of the processor 102 and generates the appropriate select signal over lines 216. The finite state machine circuit 208 receives the first and second clocks 202 and 210 from the clock divider circuit 204. The lower speed second clock 210 is provided to the system board 104 as an external clock 210. The finite state machine circuit 208 also receives a bus request signal over line 212 indicating external access from the processor 102. Within the present invention, an asserted bus request signal of line 212 indicates to the finite state machine circuit 208 that the processor 102 needs to perform external memory access operations such as load/store operations. This condition requires the processor 102 to run at the slower second clock speed 210. On the other hand, a deasserted bus request signal of line 212 indicates that the processor 102 is not performing memory access operations and therefore it can run at the higher first clock 202 speed.

In an external access operation, the processor 102 accesses external devices or peripherals such as memory, cache, etc. During the external access, the processor 102 and the external devices or peripherals are synchronized to a single clock speed for effective communication. In order to synchronize communication for the external access, the present invention switches the speed of the processor 102 from the higher first clock speed 202 to the lower second clock 210 speed. In this configuration, power dissipation is also reduced due to usage of the slower clock speed.

When the external access operation ends, the processor 102 deasserts the bus request signal of line 212 to indicate to the finite state machine circuit 208 that the processor 102 can now run at the higher first clock 202 speed. In response, the finite state machine circuit 208 generates a select signal over lines 216 for switching to the higher first clock 202 frequency F1. The select signal 216 then controls the multiplexer 206 to switch the processor 102 speed to the first clock 202 from the lower second clock 210 frequency F2.

Figure 3:
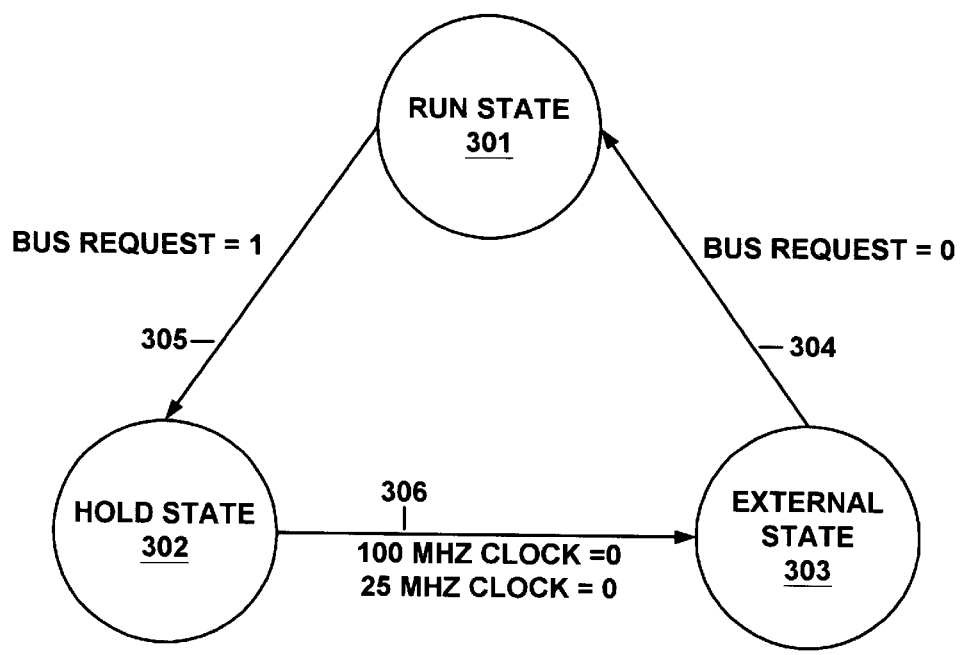
FIG. 3 illustrates the states of the finite state machine circuit used in the dynamic clocking apparatus in accordance with the present invention.

FIG. 3 illustrates a state diagram 300 of the possible states of the finite state machine circuit 208 which generates the select signal of lines 216 and also synchronizes the clocks in the dynamic clocking apparatus 200. The state diagram 300 consists of three states: run state 301, hold state 302, and external state 303. In one embodiment of the present invention, the select signal lines 216 are comprised of two lines for encoding the selection of one of the three states 301, 302, and 303. In an alternative embodiment, the select signal lines 216 are comprised of three lines, one line for each of the three states 301, 302, and 303. Each line carries one state so that when one state is on, the other states are off. The finite state machine circuit 208 can generate only one state at a time.

Depending on the states, the finite state machine circuit 208 generates a select signal of lines 216 corresponding to the state. First, the finite state machine circuit 208 in the run state 301 outputs a select signal of lines 216 that enables the multiplexer 206 to select the first clock 202. Second, the hold state 302 in the finite state machine circuit 208 corresponds to a select signal over lines 216 for selecting the ground signal of line 218 by the multiplexer 206. Finally, the finite state machine circuit 208 in the external state 303 outputs a select signal over line 216 that enables the multiplexer 206 to select the second clock 210.

The finite state machine circuit 208 of FIG. 2 takes on the states 301, 302, and 303 of FIG. 3 in the order indicated by arrows 304, 305, and 306. According to the arrows 304, 305, and 306, the sequence of the states of the finite state machine circuit 208 is run 301, hold 302, and external 303. The run state 301 corresponds to the faster first clock 202 speed is triggered by a deassertion of the bus request signal of line 212 in accordance with the present invention. In response, the finite state machine circuit 208 generates a select signal of lines 216 corresponding to the run state 301 for switching to the higher first clock 202 frequency F1 from the slower second clock 210 frequency F2. In response to the select signal of lines 216, the multiplexer 206 selects the first clock 202 as the internal clock 220 to be provided to the processor 102. The internal clock provided is preferably synchronized by the finite state machine circuit 208 to the rising edge of the first clock 202.

On the other hand, the external state 303 corresponds to the slower second clock 210 speed and is actuated by the assertion of the bus request signal of 212 in accordance with the present invention. The assertion of the bus request signal over line 212 indicates an external access requiring the internal clock 220 of the processor 102 to be switched from the higher first clock 202 speed to the lower second clock 210 speed. However, to ensure proper communication between the processor 102 and external devices such as memory which run at the lower second clock 210 speed, the second clock 210 provided to the processor 102 through the multiplexer 206 needs to be synchronized to the next rising edge of the external second clock 210.

In accordance with the present invention, in order to synchronize the internal clock 220 of the processor 102 to the external clock 210 provided to the system board 104, the finite state machine circuit 208 utilizes the hold state 302 to enable the multiplexer 206 to select the ground input signal of line 218. Initially, when the bus request signal of line 212 is asserted, the finite state machine circuit 208 generates the hold state 302 corresponding to the select signal of lines 216 for selecting the ground signal of line 218 through the multiplexer 206. The ground signal of line 218 signifies that neither the first clock 202 nor the second clock 210 is to be selected. In response to the hold state 302, the multiplexer 206 selects the ground signal 218. The hold state 302 is asserted just long enough to synchronize the internal clock 220 for the processor 102 with the next rising edge of the external clock 210 supplied to the system board 104.

Without the hold state 302, if the multiplexer 206 immediately switches the internal clock 220 from the higher first clock 202 frequency to the lower second clock 210 frequency upon the assertion of the bus request signal, then most of the time, the internal clock 220 and the external clock 210 will not be in phase. That is, the rising and falling edges of the internal clock 220 and the external clock 210 will not match.

In the present invention, whenever the bus request signal of line 212 is asserted to switch from the higher first clock 202 frequency to the lower second clock 210 frequency, the finite state machine circuit 208 generates the hold state 302. Specifically, in order to synchronize the internal and external clocks of lines 220 and 210, respectively, the finite state machine circuit 208 is held at the hold state 302 until the rising edge of the second clock 210 pulse. Hence, the internal clock on line 220 is synchronized to the rising edge of the second clock 210, which is supplied as the external clock 210. The finite state machine circuit 208 can monitor the clocks 202 and 210 and synchronize their speed and phase since the finite state machine circuit 208 receives both the first clock 202 and the second clock 210 as inputs. In this manner, the present invention synchronizes both the speed and the phase of the internal and external clocks 220 and 210, respectively.

Figure 4:
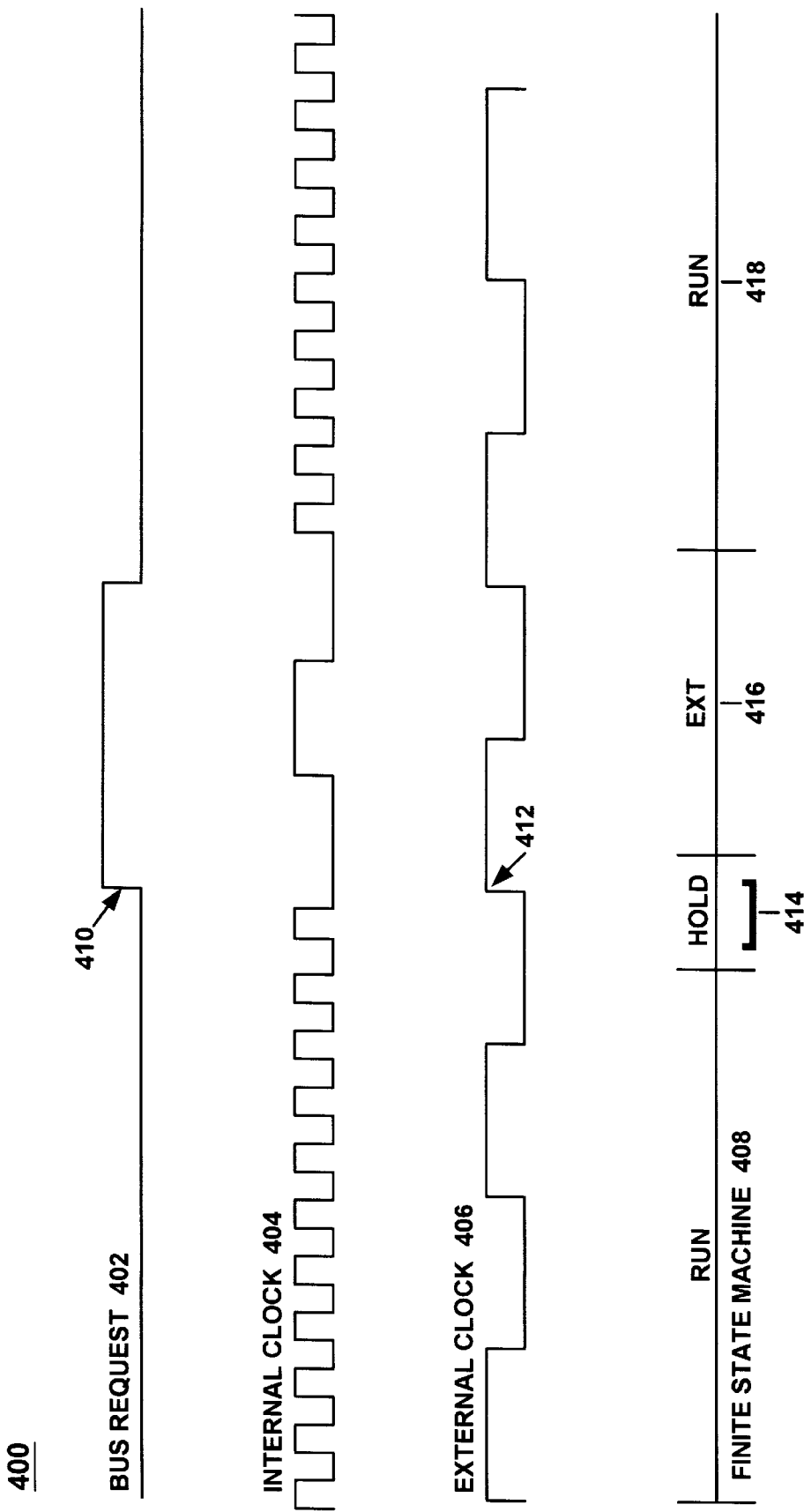
FIG. 4 shows timing diagrams of signals of the internal clock, the external clock, the finite state machine circuit, and the bus request in accordance with the present invention.

FIG. 4 depicts a timing diagram 400 of the internal clock signal 404, the external clock signal 406, the finite state machine circuit signal 408, and the bus request signal 402 for illustrating synchronization of the internal clock of line 220 with the external clock of line 210. In the timing diagram 400, the first clock of line 202 runs at four times the frequency of the second clock of line 210. For example, the first clock can run at 100 MHz while the second clock runs at 25 MHz. It will be appreciated that even though the timing diagram is illustrated in edge-triggered mode, and more particularly in positive-going transition mode, the present invention can be implemented in other modes such as negative-going transition mode.

With reference to FIG. 4, the finite state machine circuit 208 detects an external access when the processor 102 asserts the bus request signal 402 as shown by the rising edge 410. In response, the finite state machine circuit 208 initiates the switching of the internal clock of line 220 from the first clock 202 to the second clock 210. When the bus request signal 402 is asserted, the finite state machine circuit 208 takes on the hold state 414 until the external clock signal 406 reaches a rising edge 412. At this point, the external clock signal 406 and the internal clock signal 404 can by synchronized. To synchronize the clock signals 404 and 406, the finite state machine circuit 208 switches to the external state 416 and generates a select signal for selecting the external clock signal 406. In response, the multiplexer 206 selects the external clock signal 406 with lower frequency to enable external access. In contrast to the internal clock signal 404, the external clock signal 406 remains the same at the lower second clock 210 frequency F2 at all times.

On the other hand, when the bus request signal 402 is deasserted, the finite state machine circuit 208 switches from the external state 416 to the run state 418 on the rising edge of the external clock signal 406. At the same time, finite state machine circuit 208 generates a select signal 216 for selecting the first clock of line 202. In response to the select signal 216, the multiplexer 206 selects the first clock of line 202 and provides the first clock of line 202 as the internal clock of line 220 to the processor 102. The switch to the faster first clock of line 202 thus enables the processor to run at a higher speed.

In the present invention, the internal clock of line 220 is synchronized with the external clock of line 210 based on three factors: rising edge of the bus request signal 402, rising edge of the external clock 406, and the low state of the internal clock 404. With reference to FIG. 4, the finite state machine circuit 208 starts in the holding state when the bus request signal 402 is high and the internal clock signal 404 is low. The finite state machine circuit 208 stops holding when the rising edge 412 of the external clock signal 406 is reached. At this time, the finite state machine circuit 208 releases the hold 414 by deasserting ground.

For example, when the bus request signal 402 is asserted on the rising edge 410, the external clock signal 406 has not reached the rising edge. Hence, during the time period between the rising edge 410 of the bus request signal 402 and the rising edge 412 of the external clock signal 406, the state of the finite state machine circuit 208 is placed in hold state 414 corresponding to the assertion of the ground signal of line 218. When the bus request signal 402 is deasserted, the finite state machine circuit 208 releases the hold state 414.

The present invention thus switches the internal clock of line 210 for the processor 102 in a synchronous manner by providing a finite state machine circuit 208 with a hold state. In addition, by switching the internal clock of line 210 for the processor 102 between the higher first clock 202 and the lower second clock 210, the present invention provides significant savings in power dissipation when using the slower clock. In general, power required or dissipated in a computer system is directly proportional to the operating frequency of a device such as the processor 102. For a processor performing external accesses such as load/store operations at approximately 30 percent of the time, the savings in power is about 22.5 percent over a processor running at the higher clock speed at all times. Consequently, the present invention reduces reliance on fans used to cool processors.

The present invention, a dynamic clocking apparatus and system for reducing power dissipation, is thus described. While the present invention has been described in particular embodiments, it should be appreciated that the present invention should not be construed as being limited by such embodiments, but rather construed according to the claims below.

What is claimed is:

1. A dynamic clocking apparatus comprising:
   a clock divider circuit to receive a first clock and to generate a slower second clock and also to output the first clock;
   a state machine circuit to receive the first and second clocks from the clock divider circuit, the state machine circuit receiving an external access signal indicating which clock between the first and second clocks to supply as an internal clock, the state machine circuit for generating a select signal for selecting the internal clock between the first and second clocks; and
   a multiplexer coupled to the clock divider circuit for selecting the internal clock from the first and second clocks in response to the select signal and for synchronizing the internal clock with the second clock in response to the select signal when selecting the second clock, the internal clock is provided to the processor and wherein the external access signal selects the second clock as the internal clock during external memory access operations performed by the processor.

2. The apparatus as recited in claim 1 wherein the state machine circuit generates three states including:
   a run state for selecting the first clock;
   a hold state for selecting a ground signal for synchronizing the internal clock to the second clock when switching the internal clock from the first clock to the second clock; and
   an external state for selecting the second clock.

3. The apparatus as recited in claim 2 wherein the multiplexer receives the ground signal as input for synchronizing the internal clock to the second clock when switching the internal clock from the first clock to the second clock during the hold state.

4. The apparatus as recited in claim 2 wherein the state machine circuit generates the hold state when transitioning from the run state to the external state.

5. The apparatus as recited in claim 2 wherein the state machine circuit maintains the hold state until the next rising edge of the second clock is encountered.

6. The apparatus as recited in claim 2 wherein the state machine circuit switches from the external state to the run state on the rising edge of the first clock.

7. The apparatus as recited in claim 1 further comprising a clock generator circuit coupled to the clock divider circuit, the clock generator circuit for generating the first clock.

8. A computer system having a processor, a bus, and a circuit for providing a clock to the processor, the circuit comprising:
   clock divider circuit to receive a first clock, to generate a slower second clock and also to output the first clock;
   state machine circuit for generating a select signal for selecting an internal clock between the first and second clocks, wherein the state machine circuit receives the first and second clocks from the clock divider circuit, further wherein the state machine circuit receives an external access signal indicating which clock between the first and second clocks to supply as the internal clock; and
   multiplexer circuit for receiving the first and second clocks from the clock divider circuit, for selecting the internal clock from the first and second clocks in response to the select signal and for synchronizing the internal clock with the second clock in response to the select signal when selecting the second clock, the internal clock provided to the processor and wherein the external access signal selects the second clock as the internal clock during external memory access operations performed by the processor.

9. The computer system as recited in claim 8 further comprising a clock generator circuit, coupled to the clock divider circuit, for generating the first clock.

10. The computer system as recited in claim 8 wherein the state machine circuit is also for generating three states including:

a run state for selecting the first clock;

a hold state for selecting a ground signal for synchronizing the internal clock to the second clock when switching the internal clock from the first clock to the second clock; and an external state for selecting the second clock.

11. The computer system as recited in claim 10 wherein the multiplexer circuit receives the ground signal as input for synchronizing the internal clock to the second clock when switching the internal clock from the first clock to the second clock during the hold state.

12. The computer system as recited in claim 10 wherein the state machine circuit is also for generating the hold state when transitioning from the run state to the external state.

13. The computer system as recited in claim 10 wherein the state machine circuit maintains the hold state until the next rising edge of the second clock is encountered.

14. The computer system as recited in claim 10 wherein the state machine circuit switches from the external state to the run state on the rising edge of the first clock.

15. In a computer system, a method for dynamically changing the clock speed of a processor, the method comprising the steps of:

a) receiving a first clock;

b) generating a slower second clock from the first clock and supplying the second clock to circuitry external to the processor;

c) asserting a selection signal during external memory access operations performed by the processor;

d) in response to the selection signal, selecting an internal clock between the first and second clocks;

e) synchronizing the internal clock with a transition of the second clock when step d) transitions from the first clock to the second clock; and f) providing the internal clock to the processor.

16. The method as recited in claim 15 wherein said second clock is selected by step d) during said external memory access operations performed by said processor.

17. The method as recited in claim 16 wherein the selection signal is based on a bus request signal.

18. The method as recited in claim 16 wherein step e) further comprises the steps of:

holding the internal clock in an inactive state until a transition of the second clock; and starting the clock cycle of the internal clock at the same time as the start of the clock cycle of the second clock.

19. The method as recited in claim 18 wherein the transition of the second clock is a rising edge.

20. The method as recited in claim 18 wherein the transition of the second clock is a falling edge.

21. A circuit for providing a clock to a processor, the circuit comprising:

a) means for receiving a first clock;

b) means for generating a slower second clock from the first clock and supplying the second clock to circuitry external to the processor;

c) means for asserting a selection signal during external memory access operations performed by the processor;

d) means for selecting an internal clock between the first and second clocks in response to the selection signal;

e) means for synchronizing the internal clock with a transition of the second clock when the means for selecting transitions from the first clock to the second clock; and f) means for providing the internal clock to the processor.

22. The circuit as recited in claim 21 wherein said second clock is selected by the means for selecting during the external memory access operations performed by the processor.

23. The circuit as recited in claim 22 wherein the selection signal is based on a bus request signal.

24. The circuit as recited in claim 22 wherein the means for synchronizing further comprises:

means for holding the internal clock in an inactive state until a transition of the second clock; and means for starting the clock cycle of the internal clock at the same time as the start of the clock cycle of the second clock.

25. The circuit as recited in claim 24 wherein the transition of the second clock is a rising edge.

26. The circuit as recited in claim 24 wherein the transition of the second clock is a falling edge.

* * * * *